(12) United States Patent
Koch et al.

(10) Patent No.: US 12,203,816 B2
(45) Date of Patent: Jan. 21, 2025

(54) NONINVASIVE THERMOMETER

(71) Applicant: Endress+Hauser Wetzer GmbH+Co. KG, Nesselwang (DE)

(72) Inventors: Daniel Koch, Oy-Mittelberg (DE); Marc Schalles, Erfurt (DE); Harald Bründl, Schwabhausen (DE); Stephan Wiedemann, Bihlerdorf (DE); Peter Wiedemann, Weitnau (DE); Torsten Iselt, Kempten (DE); Christian Peuker, Immenstadt (DE); Pavo Vrdoljak, Nesselwang (DE); Georg Wolf, Nesselwang (DE); Christian Kallweit, Marktoberdorf (DE); Markus Mornhinweg, Dießen (DE); Alfred Umkehrer, Hopferau (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 435 days.

(21) Appl. No.: 17/753,664

(22) PCT Filed: Aug. 20, 2020

(86) PCT No.: PCT/EP2020/073389
§ 371 (c)(1),
(2) Date: Mar. 10, 2022

(87) PCT Pub. No.: WO2021/047881
PCT Pub. Date: Mar. 18, 2021

(65) Prior Publication Data
US 2022/0334003 A1     Oct. 20, 2022

(30) Foreign Application Priority Data
Sep. 12, 2019 (DE) .................... 10 2019 124 605.9

(51) Int. Cl.
*G01K 7/04* (2006.01)
*G01F 1/688* (2006.01)
(Continued)

(52) U.S. Cl.
CPC .............. *G01K 7/04* (2013.01); *G01F 1/6888* (2013.01); *G01K 1/14* (2013.01); *G01K 15/005* (2013.01)

(58) Field of Classification Search
CPC .......... G01K 1/14; G01K 7/04; G01K 15/005; G01F 1/6888
See application file for complete search history.

(56) References Cited

U.S. PATENT DOCUMENTS

| 5,382,093 A | 1/1995 | Dutcher |
| 9,562,811 B2 * | 2/2017 | Husheer ................ G01K 13/20 |

(Continued)

FOREIGN PATENT DOCUMENTS

| DE | 202006003903 U1 | 10/2006 |
| DE | 102005040699 B3 | 1/2007 |

(Continued)

*Primary Examiner* — Randy W Gibson
(74) *Attorney, Agent, or Firm* — Christopher R. Powers; Endress+Hauser (USA) Holding, Inc.

(57) ABSTRACT

The present invention includes an apparatus for determining and/or monitoring a process variable, especially the temperature, or the flow, of a medium in a containment, including a temperature sensor for registering temperature and a flexible, a heat insulating support element, which is arrangeable on an outer surface of a wall of the containment, wherein the temperature sensor is secured to the support element.

15 Claims, 3 Drawing Sheets

(51) Int. Cl.
*G01K 1/14* (2021.01)
*G01K 15/00* (2006.01)

(56) References Cited

U.S. PATENT DOCUMENTS

| | | |
|---|---|---|
| 2014/0334517 A1 | 11/2014 | Blundell et al. |
| 2016/0047699 A1* | 2/2016 | Seefeld .................... G01K 7/18 374/1 |
| 2017/0328784 A1 | 11/2017 | Blundell et al. |
| 2017/0363453 A1 | 12/2017 | Roosli et al. |

FOREIGN PATENT DOCUMENTS

| | | |
|---|---|---|
| DE | 102009003848 A1 | 11/2010 |
| DE | 102012204898 A1 | 10/2013 |
| DE | 102012112575 A1 | 7/2014 |
| DE | 102014118206 A1 | 6/2016 |
| DE | 102014119593 A1 | 6/2016 |
| DE | 102015112425 A1 | 2/2017 |
| DE | 102015113237 A1 | 2/2017 |
| DE | 102017100267 A1 | 7/2018 |
| DE | 102017120941 A1 | 3/2019 |
| DE | 102018116309 A1 | 1/2020 |
| EP | 2038625 A1 | 3/2009 |
| EP | 3230704 A1 | 3/2009 |
| EP | 2612122 B1 | 7/2013 |
| EP | 3633337 A1 | 4/2020 |

* cited by examiner

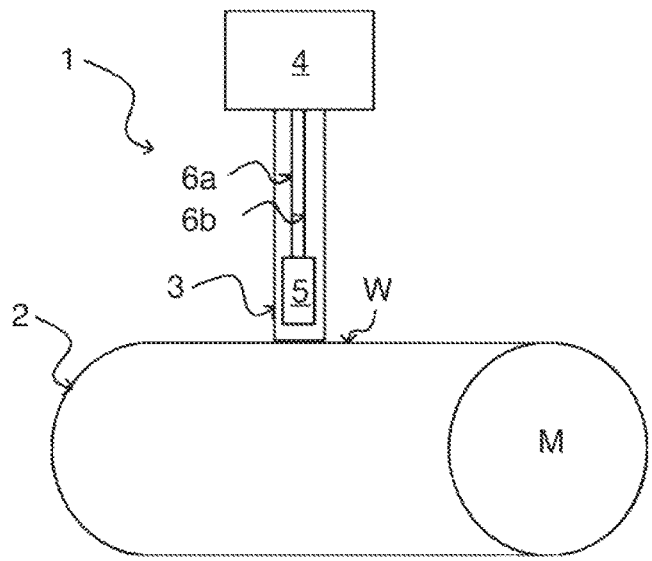
PRIOR ART    Fig. 1
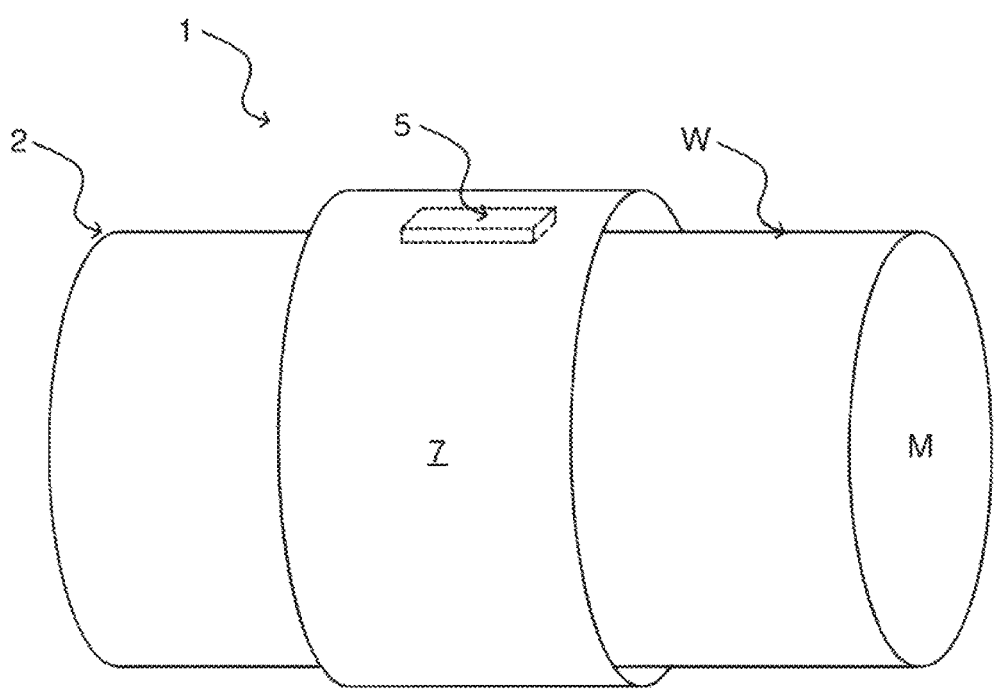
Fig. 2

NONINVASIVE THERMOMETER

CROSS-REFERENCE TO RELATED APPLICATIONS

The present application is related to and claims the priority benefit of German Patent Application No. 10 2019 124 605.9, filed on Sep. 19, 2019, and International Patent Application No. PCT/EP2020/073389, filed Aug. 20, 2020, the entire contents of which are incorporated herein by reference.

TECHNICAL FIELD

The invention relates to an apparatus for determining and/or monitoring temperature of a medium in a containment in automation technology. The containment is, for example, a container or a pipeline.

BACKGROUND

Thermometers are known in a wide variety of embodiments in the state of the art. Thus, there are thermometers, which for measuring temperature use the expansion of a liquid, a gas or a solid of known coefficient of thermal expansion, or such, which relate the electrical conductivity of a material or a variable derived therefrom to the temperature, such as, for example, the electrical resistance in the case of application of resistance elements or the thermoelectric effect in the case of thermocouples. In contrast, in the case of radiation thermometers, especially pyrometers, for determining the temperature of a substance, its heat radiation is utilized. The measuring principles of these measuring devices are described in a large number of publications.

In the case of a temperature sensor in the form of a resistance element, among others, so-called thin film- and thick film sensors as well as a so-called NTC thermistor are known. In the case of a thin film sensor, especially a Resistance Temperature Detector (RTD), sensor element is used, for example, one equipped with connection wires and applied on a substrate, wherein the rear face of the support substrate is, as a rule, metal coated. Used as sensor elements are so-called resistance elements, which are based, for example, on platinum elements and which are also commercially obtainable, among others, under the designations PT10, PT100, and PT1000.

In the case of temperature sensors in the form of thermocouples, in turn, the temperature is determined by a thermovoltage, which occurs between the unilaterally connected thermocouple wires of different materials. For temperature measurement, usually thermocouples of DIN standard IEC584 are applied as temperature detector, e.g., thermocouples of type K, J, N, S, R, B, T or E. However, also other material pairs, especially such having a measurable Seebeck effect, are possible.

The accuracy of temperature measurement depends sensitively on the thermal contacts and the particularly reigning heat conduction. The heat flows between the medium, the containment, in which the medium is located, the thermometer and the process environment in such case play a deciding role. For a reliable temperature determination, it is important that the temperature sensor and the medium be essentially in thermal equilibrium, at least for a certain time required for registering the temperature. The time for a reaction of a thermometer to a temperature change is also referred to as response time of the thermometer.

A high accuracy of measurement can especially be achieved when the temperature sensor is immersed in the medium. Thus, numerous thermometers are known, in the case of which the temperature sensor is brought more or less directly in contact with a medium. In this way, a comparatively good coupling between the medium and the temperature sensor can be achieved.

For different processes and for many containments, especially small containers or pipelines, however, a noninvasive determination of the temperature is advantageous. Thus, likewise, thermometers are known, which can be secured from the outside/inside to a containment, in which the medium is located. Such devices, also called surface thermometers or contact sensors, are known, for example, from documents such as DE102014118206A1 or DE102015113237A1. In the case of such measuring devices, the temperature sensors are not in direct contact with the process. This requires that, for assuring a good thermal coupling, various additional aspects must be taken into consideration. Thus, for example, the mechanical and therewith also the thermal contact between container and thermometer is decisive for the achievable accuracy of measurement. In the case of insufficient contact, an exact temperature determination is not possible.

Used as surface- or skin-point thermometers are frequently measuring inserts with temperature sensors in the form of thermocouples, which are directly welded to the outer surface or skin of the pipe or container. In such case, replacement of the thermocouples can be time-consuming and expensive, especially because replacement can require a temporary shutdown of the process and/or application. In order to overcome these disadvantages, there are known, for example, from U.S. Pat. No. 5,382,093 and European patent application No. 18198608.4 unpublished as of the earliest filing date of this application, in each case, embodiments of thermometers, which enable simple replacement of the temperature sensors.

Known, moreover, are numerous, different embodiments of thermometers for noninvasive temperature measurement, such as described, for example, in the documents, 18198608.4 A1, DE102005040699B3, EP3230704B1 or EP2038625B1.

A central problem in the case of noninvasive temperature determination is the draining of heat from the process to the environment. This causes a significantly greater measurement error than in the case of a direct introduction of a temperature sensor into the process.

SUMMARY

Therefore, an object of the invention is to provide a thermometer for noninvasive temperature measurement, which is distinguished by a high accuracy of measurement.

The object is achieved by the apparatus for determining and/or monitoring a process variable, especially the temperature or the flow, of a medium in a containment, especially a container or a pipeline, according to the present disclosure. The apparatus of the invention includes a temperature sensor for registering temperature and a flexible, heat insulating support element, which is arrangeable on an outer surface of the containment, wherein the temperature sensor is secured to the support element.

The support element is especially embodied in such a manner that it is fittable to the contours of the containment, or to the contours of the outer surface of the wall of the containment. The support element can be arranged, for example, at least partially around the wall of the containment. Especially preferable is an arrangement along a peripheral line of a cross sectional area perpendicular to the longitudinal axis of the containment in the case of a containment in the form of a pipeline.

The temperature sensor is preferably secured to the support element in a region of the support element facing the containment in the state arranged thereon. The apparatus is brought into thermal contact with the containment from an outer region of the containment. The temperature of the medium is accordingly determined indirectly via a wall of the containment. In such case, a draining of heat to the environment is decreased, or prevented, by means of the heat insulating support element. In this way, there reigns in the immediate vicinity of the temperature sensor, at least at times, essentially a thermal equilibrium with the process. The temperature sensor is, thus, exposed essentially to the process temperature, even though it is located outside of the containment. This, in turn, leads to an increased accuracy of measurement of the apparatus.

The apparatus can optionally further have an electronics. Alternatively, the electronics can also be a separate component, connectable with the apparatus. Advantageously associated with the temperature sensor is, furthermore, at least one connection wire for electrical contact.

An embodiment includes that the temperature sensor is a resistance element or thermocouple.

The apparatus can also further include more than one temperature sensor, wherein all temperature sensors are secured to the support element.

Another embodiment includes that the apparatus, for in situ calibrating and/or validation of at least the temperature sensor, includes at least one reference element, which is secured to the support element and which is composed at least partially of at least one material, which has in the temperature range relevant for calibrating the first temperature sensor at least one phase change at at least one predetermined phase change temperature, in the case of which phase change the material remains in the solid state. In this regard, comprehensive reference is made to EP02612122B1 in the context of the present invention. Advantageously, the support element prevents an undesired draining of heat for the temperature sensor and the reference element independently of the exact arrangement on the support element relative to one another. Preferably, the temperature sensor and the reference element are always essentially in thermal equilibrium.

In an embodiment, the apparatus includes a heating element, which is secured to the support element. By means of the heating unit, the apparatus can additionally be heated to a predeterminable temperature. Again, the heat insulating support element provides for a lessening, or preventing, of undesired draining of heat.

Moreover, by means of the heating element, a determining of flow can be performed according to the measuring principle of thermal flow measurement well known per se in the state of the art.

In accordance therewith, the flow can be determined in two different ways. Within the scope of the invention, the terminology, flow, includes both a volume flow as well as also mass flow of the medium. Likewise, a flow velocity or flow rate of the medium can be ascertained.

In the first measuring principle, a sensor element is exposed to a medium flowing through a pipeline and heated in such a manner that its temperature remains essentially constant. In the case of known, and, at least at times, constant properties of the medium, such as the temperature of the medium, its density or composition, the mass flow rate of the medium through the pipeline can be ascertained based on the heating power needed for keeping the temperature at the constant value. The temperature of the medium, in such case, is that temperature, which the medium has without an additional heat input of a heating element. In the case of the second measuring principle, in contrast, the heating element is operated with constant heating power and the temperature of the medium measured downstream from the heating element. In such case, the measured temperature of the medium provides information concerning mass flow rate.

The heating element can be, for example, a resistance heater. For example, so-called resistance elements, e.g., RTD resistance elements (Resistance Temperature Detector), especially platinum elements, are used, such as obtainable commercially under the designations, PT10, PT100, and PT1000. The resistance elements are heated via conversion of electrical power supplied to them, e.g., as a result of an increased electrical current supply.

In another embodiment of the apparatus, the temperature sensor comprises a temperature sensitive sensor element, which is electrically connected via at least first and second connection lines, wherein the first connection line is divided into first and second sections, wherein the first section near to the sensor element is composed of a first material, and wherein the second section far from the sensor element is composed of a second material differing from the first, wherein the second connection line is composed of the second material, and wherein the first section of the first connection line and at least one subregion of the second connection line form a first difference temperature sensor in the form of a thermocouple. In this connection, in the context of the present invention, comprehensive reference is made to the German patent application No. 102018116309.6 unpublished as of the earliest filing date of this application. With such an embodiment of the temperature sensor, a draining of heat in the region of the temperature sensor can be registered. An exact knowledge of the draining of heat further increases the accuracy of measurement of the apparatus. In the case of determining a flow, with declining draining of heat, higher flow rates of the medium in the containment can be detected, i.e., the measuring range of the apparatus can be expanded.

Preferably, the at least one temperature sensor as well as the, in given cases, likewise present reference element and/or heating element are secured altogether to the support element in a region of the support element facing the containment in the state arranged thereon. In such case, all conceivable, especially geometric, arrangements of the mentioned components of the apparatus on the support element are possible and fall within the scope of the invention.

A preferred embodiment of the apparatus of the invention is that there is arranged at least partially on the support element a unit comprising, at least partially, a material with anisotropic thermal conductivity. In this connection, comprehensive reference is made to the German patent application No. DE102017100267A1 in the context of the present invention. The unit can be, for example, an, especially thin walled, film or foil, for example, of graphite. Preferably, the film or foil is arranged on a region of the support element facing the containment in the state secured thereto.

Thus, advantageously, at least the temperature sensor and, in given cases, also the reference element and/or heating element are arranged between the support element and the unit. The unit serves for targeted distribution of heat from the process along the part of the support element facing the containment. Thus, it is assured that all components of the apparatus arranged on the support element, especially the at least one temperature sensor and an, in given cases present, reference element are always in thermal equilibrium with one another.

In a preferred embodiment of the apparatus, the support element is composed of a plastic or a ceramic. The support element is, in such case, preferably an areal shape with predeterminable geometric dimensions.

Another preferred embodiment includes that at least one guide is present to lead at least one connection line of at least the temperature sensor and, in given cases, also the reference element and/or heating element into the support element. The guide can be, for example, a cavity, a groove, a passageway or a hole in the support element. Also, sleeves can be introduced into the support element.

The guide serves for mechanical stabilizing of the connection lines and prevents an undesired tearing. The number of guides depends on the number of connection lines and on the number of components secured to the support element, for example, extra temperature sensors, a heating element or a reference element.

In another preferred embodiment, the apparatus includes at least one flexible circuit board, which serves at least partially as connection line at least for the temperature sensor and, in given cases, for the heating element and/or the reference element. Because, at least partially, especially in a region directly neighboring the temperature sensor, a flexible circuit board is used as connection line, such connection line can be led sectionally in parallel with the support element and, associated therewith, in parallel with the wall of the containment. Like the support element, the flexible circuit board adapts to the contours of the containment. Such a guiding of the connection lines in parallel with, or along, the wall of the containment further reduces the occurrence of undesired draining of heat to the environment of the process.

An especially preferred embodiment is that at least one recess is provided for introducing at least the temperature sensor and, in given cases, the reference element and/or heating element into the support element. Especially preferably, the recess is embodied in such a manner that the temperature sensor and, in given cases, the reference element and/or heating element lie essentially flush with a surface of the support element.

The temperature sensor and, in given cases, the reference element and/or heating element can, for example, be secured to the support element, especially in a recess thereof, by means of an adhesive. A securement by means of an adhesive is, however, not necessary according to the invention. Rather, all usual securements can be utilized for securing a temperature sensor and, in given cases, the heating element and/or reference element.

Another embodiment includes that the apparatus comprises securement means for an, especially releasable, securing of the apparatus to the containment. In this regard, all suitable securement means usual for those skilled in the art, such as e.g. tube clamps, can be used and fall within the scope of the invention.

In such case, advantageously the securement means are embodied to assure a predeterminable compressive pressure of the support element on the containment. In this way, a good and reproducible thermal contact between a wall of the containment and the support element can be assured.

The securement means can advantageously comprise at least one magnet, which is arranged on the support element, or at least one bolt having a screw thread.

In another embodiment, the apparatus includes an envelope element, which surrounds the support element at least partially on a side far from the containment.

In this regard, the envelope element advantageously serves as securement means for securing the apparatus to the containment, especially wherein a geometry of the envelope element includes at least one groove or at least one hole.

BRIEF DESCRIPTION OF THE DRAWINGS

The invention will now be explained in greater detail based on the appended drawing. The figures of the drawing show as follows:

FIG. 1 shows a thermometer for noninvasive temperature measurement according to the state of the art;

FIG. 2 shows a first embodiment for a thermometer of the present disclosure having a temperature sensor;

DETAILED DESCRIPTION

Figure 3:
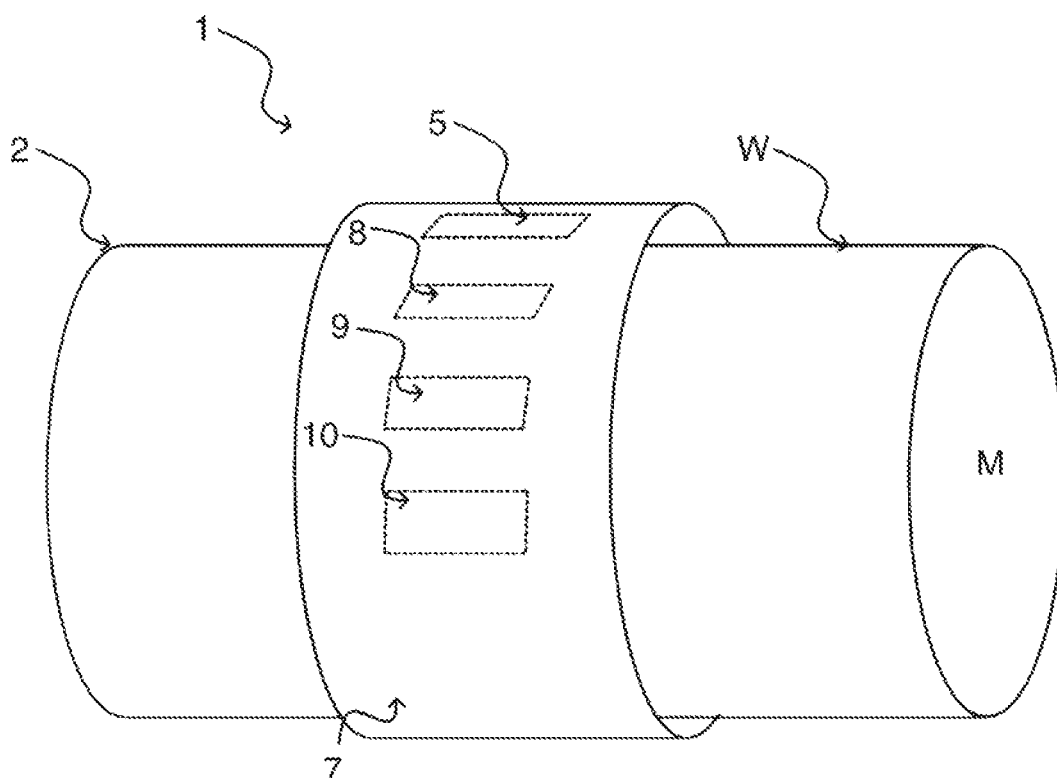
FIG. 3 shows a second embodiment for a thermometer of the present disclosure with two temperature sensors, a heating element and a reference element.

In the figures, equal elements are provided with equal reference characters. The embodiments of the different figures are, furthermore, combinable with one another to the extent desired.

Shown in FIG. 1 is a schematic view of a thermometer 1 according to the state of the art having a measuring insert 3 and an electronics 4. The thermometer 1 serves for registering the temperature T of a medium M, which is located in a containment 2, in such case, in the form of a pipeline. For such purpose, the thermometer 1 does not protrude into the pipeline 2, but, instead, is superimposed externally on a wall W of the pipeline 2 for a noninvasive temperature determination.

The measuring insert 3 includes a temperature sensor 5, which in the present case comprises a temperature sensitive element in the form of a resistance element. Temperature sensor 5 is electrically contacted via the connection lines 6a, 6b and connected with the electronics 4. While the shown thermometer 1 is embodied in compact construction with integrated electronics 4, in the case of other thermometers 1 the electronics 4 can also be arranged separately from the measuring insert 3. Also, the temperature sensor 5 does not necessarily have to be a resistance element and the number of connection lines 6 does not necessarily have to amount to two. Rather, the number of connection lines 6 can be suitably selected, depending on applied measuring principle and applied temperature sensor 5.

As already shown, the accuracy of measurement of such a thermometer 1 depends highly on the materials utilized for the thermometer and on the, especially thermal, contacts, especially in the region of the temperature sensor 5. Temperature sensor 5 is indirectly in thermal contact with the medium M, e.g., via the measuring insert 3 and via the wall W of the containment 2. A large role is played in this connection also by a draining of heat of the medium M to the environment, which can lead to an undesired temperature gradient in the region of the temperature sensor 5.

In order suitably to resolve these problems, according to the invention an alternative embodiment for a noninvasive thermometer 1 is provided, such as shown in the following figures by way of example based on some preferred embodiments.

A first embodiment of a thermometer 1 of the invention is shown in FIG. 2. The thermometer 1 includes a flexible heat insulating support element 7, which is arranged on an outer surface of the wall W of the containment 2. For the example shown in such case, with a containment 2 in the form of a pipeline, the support element 7 is arranged perpendicularly to the longitudinal axis of the pipeline 2 around the outer surface of the wall W of the pipeline 2. The support element 7 is, thus, fitted to the contours of the pipeline 2. It is to be noted here that an apparatus 1 of the invention can also be applied in connection with containers or other types of containments. Support element 7 is, in such case, placeable on the outer surface of the wall W of the utilized containment 2 and correspondingly fitted to its contour in a predeterminable region.

The temperature sensor 5 is secured to the support element 7. Temperature sensor 5 is secured to the support element 7 in a region of the support element 7 facing the process, and, therewith, the outer surface of the wall W of the containment 2. In ongoing operation, support element 7 serves to lessen, or to prevent, an undesired draining of heat from the process, thus, from the medium M, to the environment. Because the surface of the support element 7 is arranged on, or secured to, the wall W of the containment 7, a good heat insulation can be achieved over the total surface region of the support element facing the containment. In this way, the temperature sensor 5 is essentially in thermal equilibrium with the medium M, this resulting in a high accuracy of measurement of an apparatus 1.

Besides the temperature sensor 5, the apparatus 1 can use other components, such as shown, by way of example, in FIG. 3. In comparison with the embodiment shown in FIG. 2, the apparatus 1 of FIG. 3 includes, supplementally, a heating element 8, a reference element 9 and an additional temperature sensor 10.

Figure 4A:
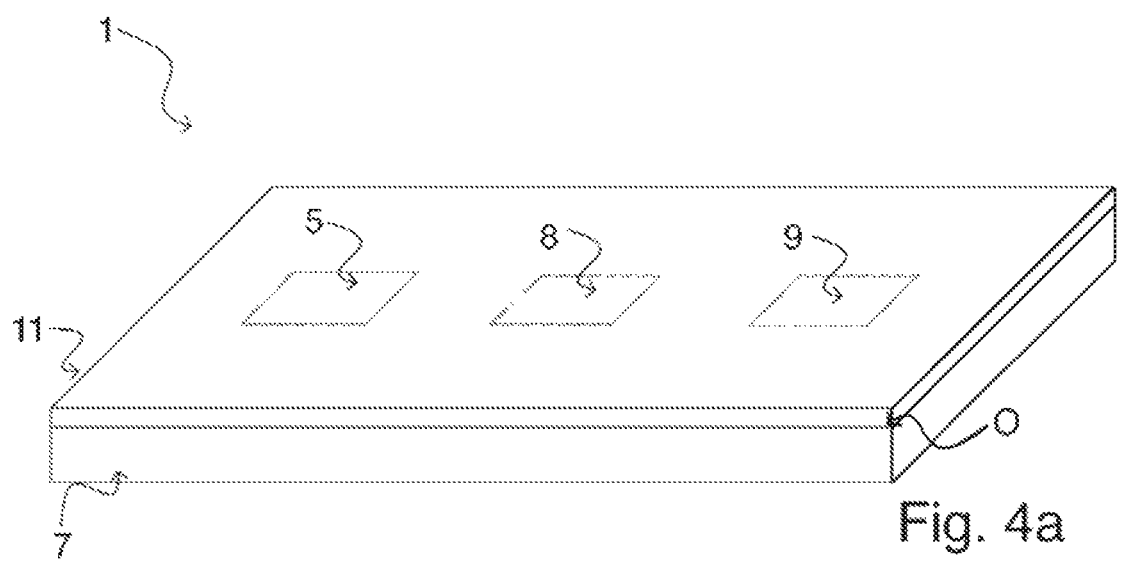
FIGS. 4a and 4b show a third embodiment for a thermometer of the present disclosure in perspective and cross-sectional views, respectively, with a unit comprising a material with anisotropic thermal conductivity and a support element provided with recesses.

In the embodiment shown in FIG. 4a, the thermometer 1 includes, furthermore, a unit 11, which at least partially comprises a material with anisotropic thermal conductivity. Such is arranged on the support element 7 on a side of the support element 7 facing the medium M, and the containment 2. This serves for uniform heat distribution along the surface O of the support element 7 facing the containment. For the example shown here, it is assumed that the unit 11 is a thin graphite foil, which is secured to the support element 7.

Figure 4B:
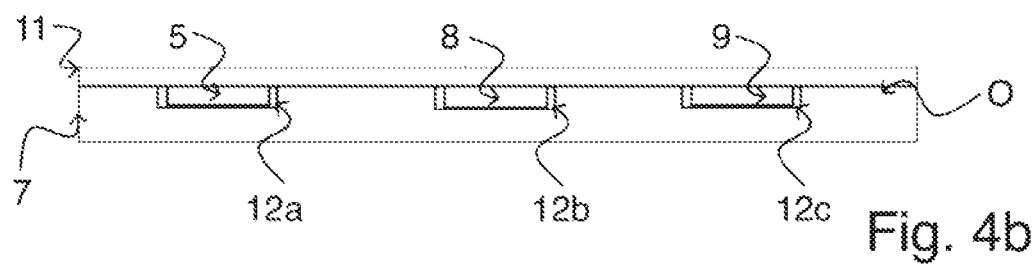

Temperature sensor 5, heating element 8 and reference element 9 are arranged between the unit 11 and the support element 7. As shown in FIG. 4b, the support element 7 has three recesses 12a-12c for receiving the temperature sensor 5, the heating element 8 and the reference element 9, respectively, in such a manner that such terminate essentially flush with the surface O.

Figure 5:
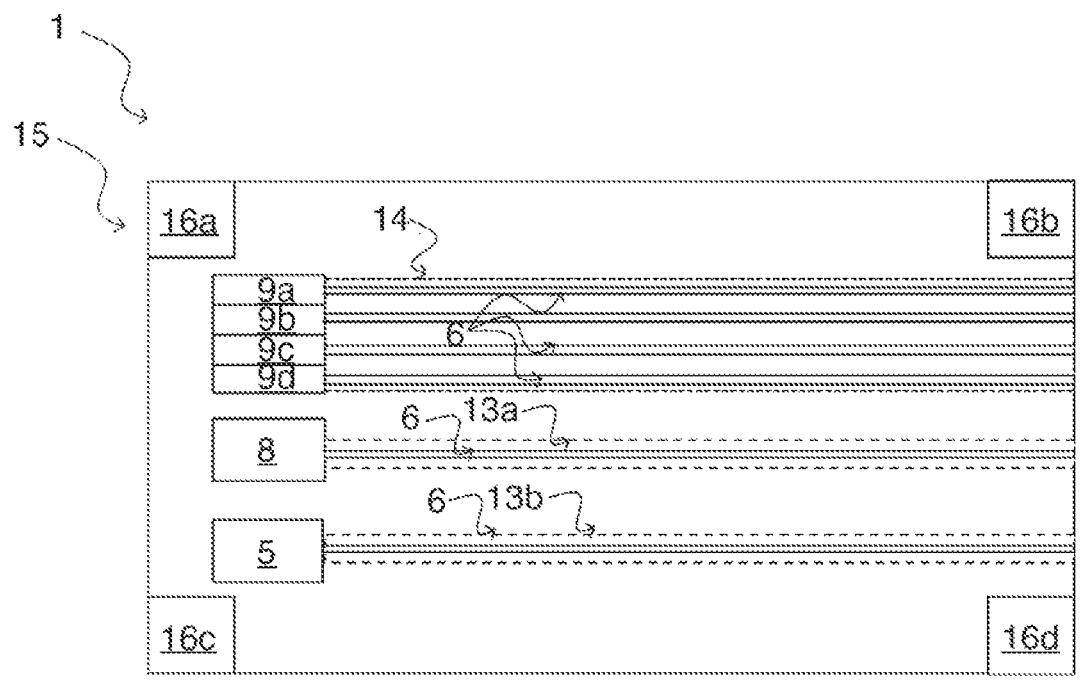
FIG. 5 shows a fourth embodiment for a thermometer of the present disclosure with guides for connection lines and securing means.
Figure 6:
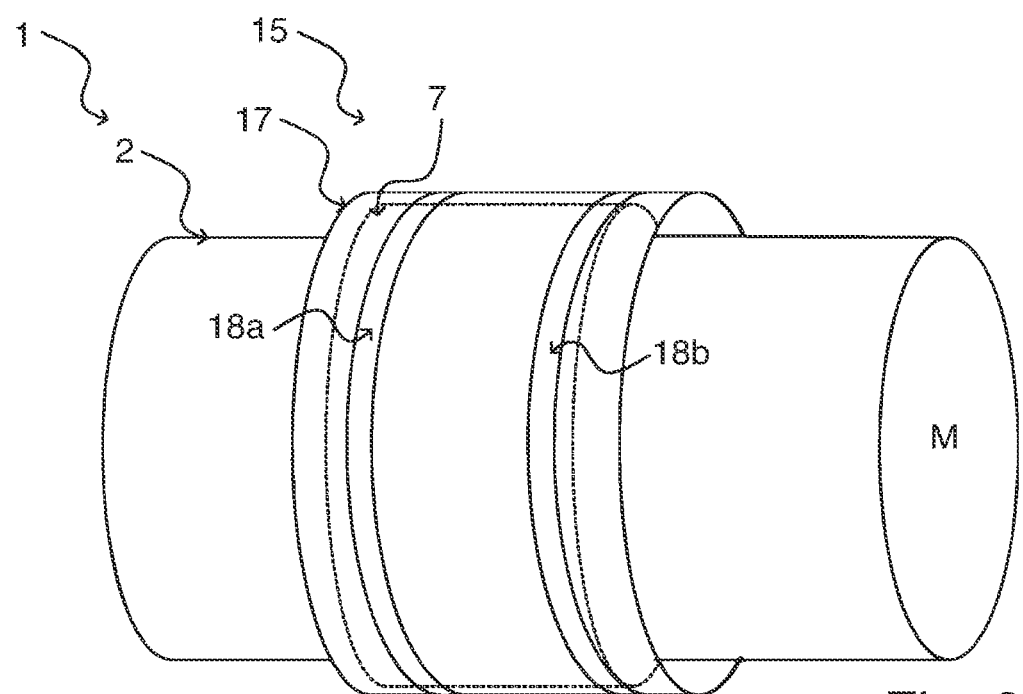
FIG. 6 shows a fifth embodiment of a thermometer of the present disclosure with an envelope element.

In the embodiment shown in FIG. 5, the apparatus 1 has four adjoining reference elements 9a-9d, which have different phase change temperatures, and which are electrically contacted via the flexible circuit board 14 with, in each case, two connection lines 6. A flexible circuit board 14 can, however, also be used for contacting the temperature sensor 5 and/or the heating element 8. For electrical contact of the temperature sensor 5 and the heating element 8, likewise, in each case, two connection lines 6 are provided, which are led through the guides 13a, 13b. In such case, the guides 13a, 13b can be, for example, grooves, recesses or passageways For securing the apparatus 1 on the containment 2, furthermore, four magnets 16a-16d are arranged on the support element 7. However, also other securement means 15 can be applied and fall likewise within the scope of the invention. In the embodiment of FIG. 6, the apparatus 1 includes, for example, furthermore, an envelope element 17, which surrounds the support element 7 and serves for securing the support element 7 to the containment. For this purpose, the envelope element 17 includes for the shown embodiment two grooves 18a, 18b, in which, for example, clamps can be arranged for securing to the containment 2.

Alternatively, securement can also occur by means of bolts with screw threads. For such case, likewise an envelope element is used, which can, for example, be provided with at least one hole.

LIST OF REFERENCE CHARACTERS 1 apparatus
2 containment
3 measuring insert
4 electronics
5 temperature sensor
6 connection wires
7 support element
8 heating element
9 reference element
10 another temperature sensor
11 unit
12 recesses
13 guides
14 flexible circuit board
15 securement means
16 magnets
17 envelope element
18 grooves
M medium
T temperature
W wall of the containment
O surface of the support element facing the containment

The invention claimed is:

1. An apparatus for determining and/or monitoring a temperature or flow of a medium in a containment, the apparatus comprising:
a temperature sensor adapted to register the temperature;
a flexible, heat-insulating support element, which is configured to be disposed on an outer surface of a wall of the containment, wherein the temperature sensor is secured to the support element; and
a unit comprising at least partially a material with anisotropic thermal conductivity, wherein the unit is disposed on the support element.

2. The apparatus of claim 1, wherein the temperature sensor is a resistance element or a thermocouple.

3. The apparatus of claim 1, further comprising at least one reference element configured for in situ calibrating and/or validation of at least the temperature sensor, wherein the at least one reference element is secured to the support element and is comprised of at least one material, which at least one material has at least one phase change at at least one predetermined phase change temperature in a temperature range suitable for calibrating the temperature sensor, wherein the at least one material remains in a solid state in the at least one phase change.

4. The apparatus of claim 1, further comprising a heating element, which is secured to the support element.

5. The apparatus of claim 1, wherein the temperature sensor comprises a temperature sensitive sensor element electrically connected via at least a first connection line and a second connection line,
wherein the first connection line includes a first section and a second section, wherein the first section, which is proximal to the sensor element, is comprised of a first material, and wherein the second section, which is distal to the sensor element, is comprised of a second material differing from the first material,
wherein the second connection line is comprised of the second material, and
wherein the first section of the first connection line and at least one portion of the second connection line define a first difference temperature sensor in the form of a thermocouple.

6. The apparatus of claim 1, wherein at least the temperature sensor is disposed between the support element and the unit.

7. The apparatus of claim 1, wherein the support element is comprised of a plastic or a ceramic.

8. The apparatus of claim 5, further comprising at least one guide configured to lead at least one of the first and/or second connection lines of at least the temperature sensor into the support element.

9. The apparatus of claim 5, further comprising at least one flexible circuit board configured at least partially as one or more of the first and second connection lines for the temperature sensor.

10. The apparatus of claim 1, wherein the support element includes at least one recess configured to introduce at least the temperature sensor into the support element.

11. The apparatus of claim 1, further comprising a securement means configured to releasably secure the apparatus to the containment.

12. The apparatus of claim 11, wherein the securement means comprise at least one magnet arranged on the support element, or at least one bolt having a screw thread.

13. The apparatus of claim 1, further comprising an envelope element that surrounds the support element at least partially on a side opposite the containment.

14. The apparatus of claim 11, wherein the securement means includes an envelope element, which surrounds the support element at least partially on a side opposite the containment and is configured to secure the apparatus to the containment.

15. The apparatus of claim 14, wherein the envelope element includes at least one groove or at least one hole.

* * * * *